UNITED STATES PATENT OFFICE.

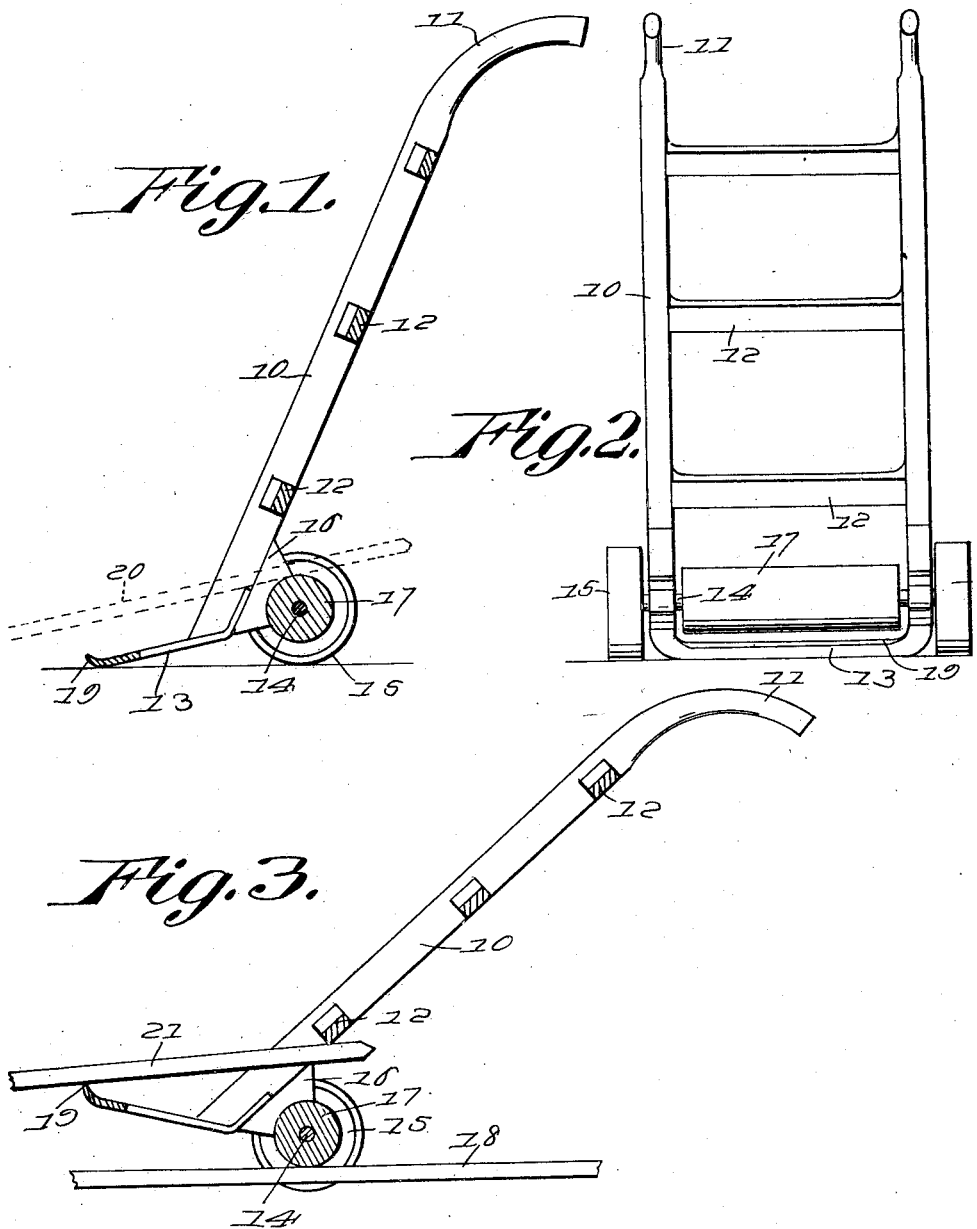

CHARLES HOLDEFER, OF DONNELLSON, IOWA.

TRUCK.

1,361,728.     Specification of Letters Patent.     Patented Dec. 7, 1920.

Application filed February 12, 1920. Serial No. 358,013.

*To all whom it may concern:*

Be it known that I, CHARLES HOLDEFER, a citizen of the United States of America, residing at Donnellson, in the county of Lee and State of Iowa, have invented new and useful Improvements in Trucks, of which the following is a specification.

The object of the invention is to provide a truck of the type used in connection with warehouse, freight and express office and similar work for the transportation of bags, boxes, trunks and similar receptacles and packages by hand, whereby the range of usefulness of the same may be enlarged or extended, particularly with a view to facilitating the loading of articles upon a wagon or transferring the same from a platform to a wagon or vice versa, where a skid or plank must be used or can be used with the greatest convenience as a support for the truck and may be of a width less than that necessary to provide a bearing for the usual truck wheels or rollers; and furthermore to provide a truck of this type which may be conveniently used as a means of transporting and positioning such skids or planks as may be required to provide a bridge for the truck or a runway which may be traversed by the truck in such loading and unloading operations; and with these objects in view the invention consists in a construction and combination of parts of which a preferred embodiment is shown in the accompanying drawing, wherein:

Figure 1 is a sectional view of the truck as seen when in its inactive or loading position.

Fig. 2 is a rear view of the same.

Fig. 3 is a sectional view similar to Fig. 1 in which the truck is in the active or carrying position upon a plank or skid.

The truck in general form corresponds with those now in common use, in that it is provided with side members 10 having the terminal handles 11 and connected by cross bars or braces 12, a rest or scoop 13 rigidly secured to the side bars or members and a transverse axle 14 upon which, exteriorly of the side bars or members are mounted the bearing wheels 15, said axle being mounted in bearings formed in blocks 16 which depend or extend rearwardly from and are arranged respectively in the planes of the said bars or members 10.

Mounted upon the transverse axle 14, or other similar and equivalent support, preferably in rear of the plane of the said bars or members 10 and between the planes transversely of said members, is a roller 17 adapted to be used as a supporting element for the truck in traversing a skid or plank as indicated at 18 in Fig. 3 as in loading a wagon which cannot be backed up to the platform or which must be loaded from the ground, and when the skid or plank employed as the bridge or runway is of a width less than the interval between the planes of the usual supporting wheels 15.

The forward edge of the rest or scoop 13 is preferably upturned and reduced to form a lip 19 designed to prevent the sliding of a bag or other receptacle from the upper surface of the rest while being transported, and also adapted to be inserted with facility and with the end of a skid or plank, as indicated in dotted lines in Fig. 1 at 20 which is intended to be used as a bridge or runway for the truck and which the operator desires to transport to the point of use and properly position to perform the desired function. As the nose or forward edge of the rest or scoop of the truck is forced under the skid or plank and is advanced with reference thereto, the space between the side bars or members 10 of the truck below the lowermost transverse bar or brace 12 being entirely open, the end of the plank will run back between the side bars and under said brace, striking the surface of the roller 17 and passing over the same as indicated in Fig. 1, whereupon the depression of the handle or grip portions of the truck to the position indicated in Fig. 3 will cause the engagement of the skid or plank as shown at 21 in Fig. 3, with spaced portions of its opposite surfaces bearing respectively upward against the lowermost cross bar 12 and downward upon the reduced lip 19, so that the skid or plank may be lifted from the floor or ground or platform and carried by means of the truck to a position in the desired relation with the vehicle to be loaded or the platform which is to be approached by the truck in the transfer of merchandise, and with reference to which said skid or plank is designed to form the bridge or runway for traverse by the roller 17.

It will be understood that the disengagement of the truck from the skid or plank thus transported may be accomplished simply by relieving the downward pressure upon the handles or grips and drawing the truck backward.

By reason of this construction and adaptability of the truck it is possible for the operator to accomplish the transfer of goods and the successive positioning of the skid or plank necessarily used in that connection without releasing the truck or performing a separate operation in carrying and arranging the skid or plank, and hence without the loss of time incident to these operations under the ordinary conditions.

What is claimed is:

1. A hand truck having a frame provided with side supporting wheels and an intermediate roller disposed in axial parallelism with said wheels for traversing a runway of a width less than the interval between said wheels.

2. A hand truck having side bars or members and side bearing wheels, and a roller disposed in axial parallelism with said wheels and occupying the space between the inner surfaces of said side bars.

3. A hand truck having its frame provided with side bars or members connected near their lower ends by a transverse bearing bar and at their lower ends by a forwardly extending rest or scoop, side bearing wheels mounted upon the frame, and a roller disposed in axial parallelism with the bearing wheels in rear of the plane of said side bars and with its upper surface below the plane of said bearing bar.

In testimony whereof I affix my signature.

CHARLES HOLDEFER.